United States Patent [19]

Jackson et al.

[11] 4,054,770

[45] Oct. 18, 1977

[54] INDUCTION HEATING OF STRIP AND OTHER ELONGATE METAL WORKPIECES

[75] Inventors: William Barry Jackson, Wirral; Roger Charles Gibson; Ralph Waggott, both of Chester, all of England

[73] Assignee: The Electricity Council, England

[21] Appl. No.: 665,365

[22] Filed: Mar. 10, 1976

[30] Foreign Application Priority Data

Mar. 10, 1975  United Kingdom ............... 9952/75

[51] Int. Cl.² .............................................. H05B 5/06
[52] U.S. Cl. ........................... 219/10.61 R; 219/10.43; 219/10.79
[58] Field of Search ............... 219/10.61, 10.41, 10.43, 219/10.79, 10.67, 10.69, 10.71; 336/132, 134; 310/191, 209, 269

[56] References Cited

U.S. PATENT DOCUMENTS

| | | | |
|---|---|---|---|
| 2,448,009 | 8/1948 | Baker | 219/10.61 X |
| 2,673,274 | 3/1954 | Vaughan et al. | 219/10.43 X |
| 2,902,572 | 9/1959 | Lackner et al. | 219/10.61 X |
| 3,031,555 | 4/1962 | Ross et al. | 219/10.61 X |
| 3,444,346 | 5/1969 | Russell et al. | 219/10.61 |
| 3,737,613 | 6/1973 | Gillock | 219/10.43 |
| 3,740,600 | 6/1973 | Turley | 310/269 |
| 3,842,234 | 10/1974 | Seyfried | 219/10.43 |
| 3,846,609 | 11/1974 | Enk | 219/10.43 |

FOREIGN PATENT DOCUMENTS

| | | | |
|---|---|---|---|
| 921,401 | 11/1954 | Germany | 219/10.61 |

Primary Examiner—Bruce A. Reynolds
Attorney, Agent, or Firm—Beveridge, De Grandi, Kline & Lunsford

[57] ABSTRACT

Transverse flux heating of strip material is effected with a flux distribution having a low value near the margins of the strip and rising substantially uniformly inwardly from the margins to a central peak value for narrow strip or two peaks with a central lower flux region for wider strip. Constructions of pole pieces to achieve the required flux distribution are described.

11 Claims, 15 Drawing Figures

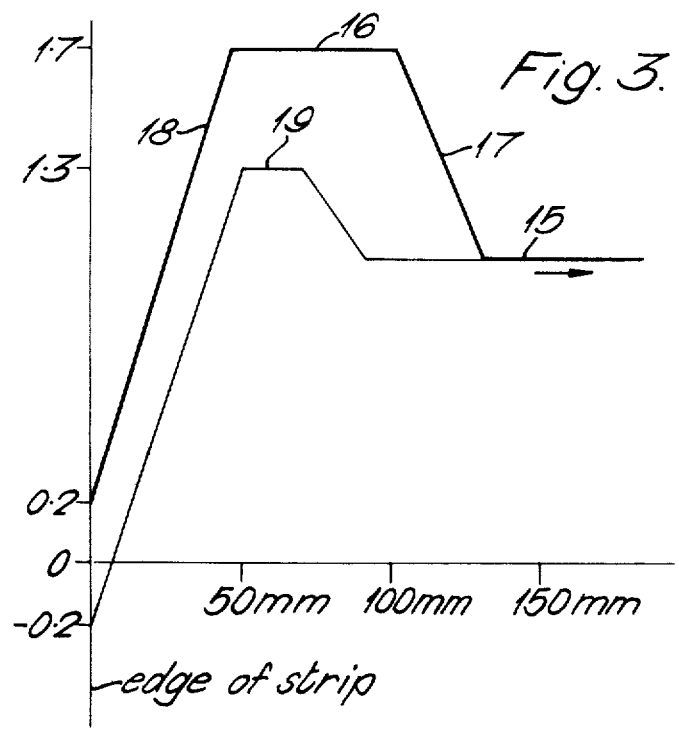
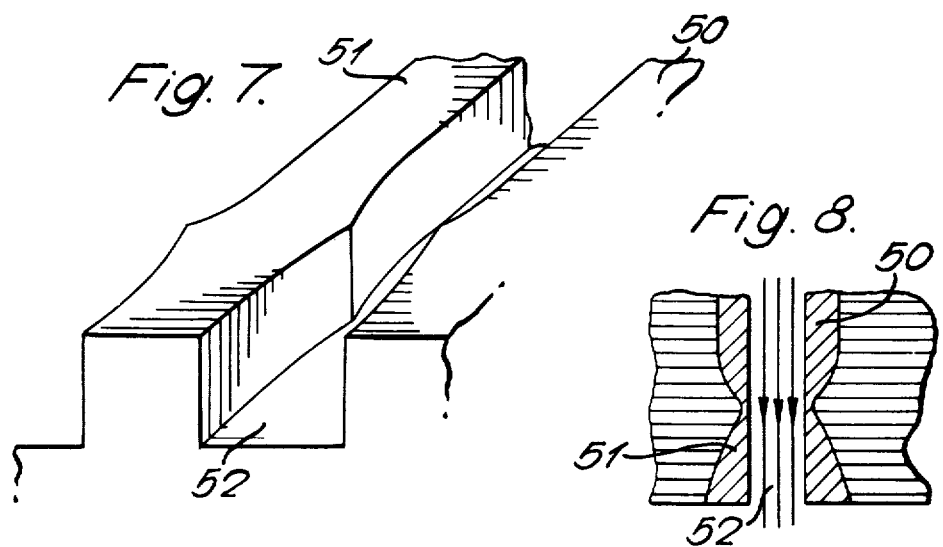

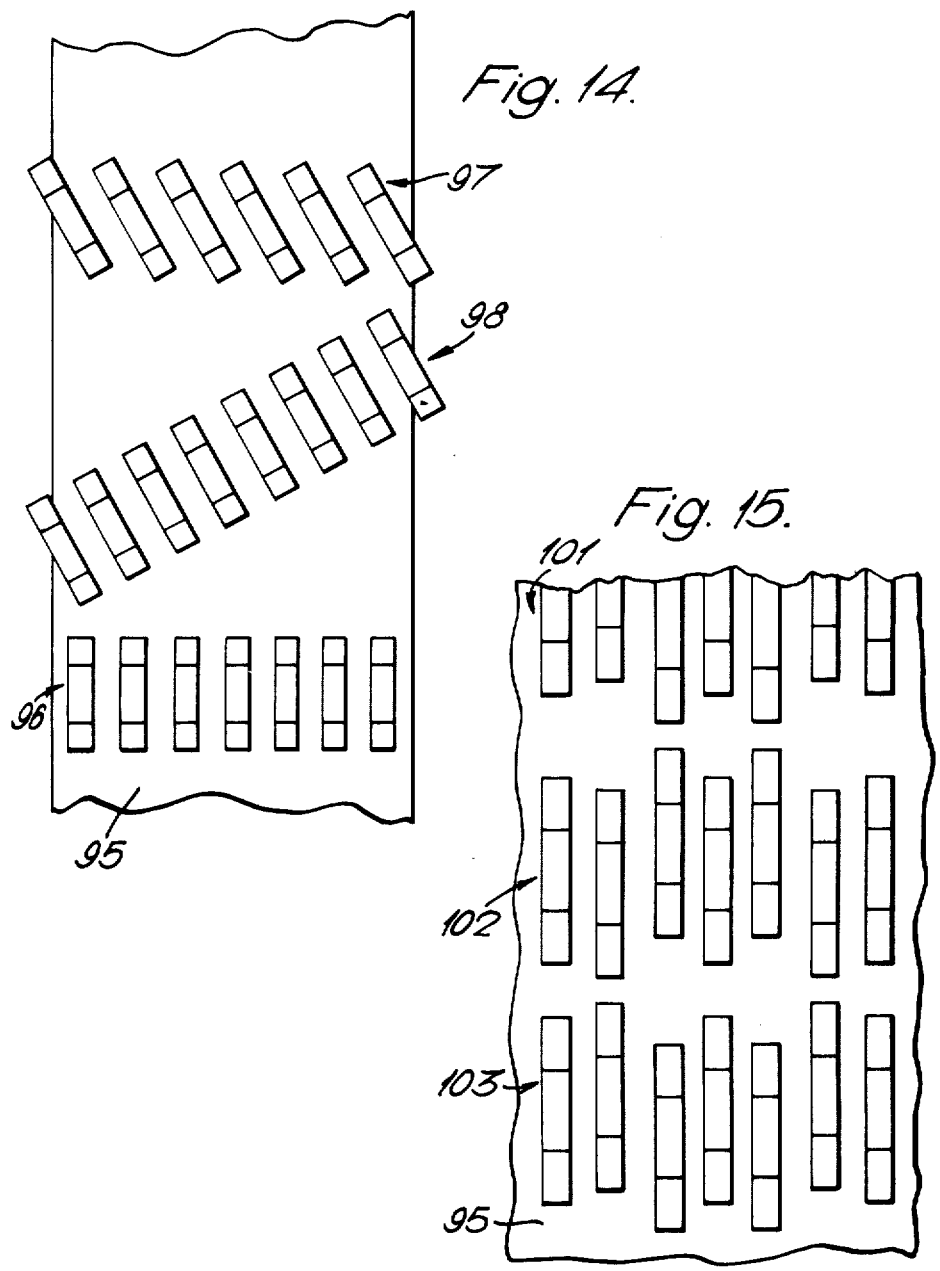

INDUCTION HEATING OF STRIP AND OTHER ELONGATE METAL WORKPIECES

BACKGROUND OF THE INVENTION

This invention relates to the induction heating of strip and other elongate metal workpieces in which relative movement in the lengthwise direction of the workpiece is effected betweem the workpiece and an induction heater. The invention is applicable to single phase or polyphase induction heaters. The induction heater would normally form part of a fixed heating furnace through which the workpiece is moved.

It is often required to re-heat strip and other elongate metal workpieces, for example before passing them through a rolling mill. It is known to use transversely directed flux for induction heating. The strip is normally but not necessarily moved in a horizontal plane and the poles of the induction heaters are arranged above and/or below the strip so that the flux passes vertically through the strip. The usual practice has been to employ inductors having pole pieces which pole pieces extend transversely across the strip for the whole width thereof. The poles are usually of alternate polarity and may be spaced evenly or unevenly along the length of the strip. One of the problems heretofore has been the non-uniform temperature profile across the width of the strip or workpiece.

SUMMARY OF THE INVENTION

The present invention is directed to a method and apparatus for obtaining a more uniform temperature distribution. This is achieved by control of the flux intensity across the width of the strip. Such control of flux intensity can be obtained in a number of ways as will be more fully described later, for example by having the pole dimension varying across the width of the strip or by varying the gap length in the magnetic circuit, e.g. between the pole face and the strip, or by varying the permeability of the core across the width of the strip or otherwise modifying the magnetic circuit. The important factor is the flux per unit width across the strip. In this specification, the expression "flux per unit width" is used to mean the amount of flux in each pole assembly for each unit of length in a direction across the strip at right angles to the length of the strip. Physically the pole pieces might extend obliquely across the strip. Their dimensions may vary across the width of the strip. The flux per unit width depends on the flux density and also on the pole dimension considered along the length of the strip. The flux per unit width can conveniently be controlled by controlling the flux density but, as will be apparent from the following description, the flux per unit width can be controlled independently of the flux density by controlling the area over which the flux is distributed.

According to this invention, in a method of heating a strip or other elongate workpiece by passing it lengthwise through a transverse flux induction heater, the induction heater is arranged to provide a flux per unit width, as hereinbefore defined, which is non-uniform across the width of the strip having a magnitude at the two edges of the strip between plus and minus 20% of the flux per unit width in the centre of the strip.

For a narrow strip, e.g. 150 mm wide or less, the flux per unit width is preferably arranged to rise uniformly from the edges of the strip towards the centre. It will be understood that if the flux at the edges of the strip is minus 20% of the flux at the centre, then a uniform rise in flux means a substantially linear relation between flux and distance across the strip from −20% through zero to 100% at the centre.

For strip wider than 150 mm, it is preferred to have a flux per unit width with two peaks inwardly from the marginal edges of the strip. Thus, according to one aspect of the present invention in a method of heating a strip or other elongate workpiece by passing it lengthwise through a transverse flux electric induction heater wherein the strip is 150 mm or more wide, the induction heater is arranged to provide a flux per unit width which is non-uniform across the width of the workpiece, the flux per unit width being substantially uniform in the central part of the workpiece and having a magnitude at the two edges of the strip within plus or minus 20% of the flux per unit width in the centre of the strip, the flux per unit width inwardly from the edges of the strip increasing to a peak value between 30% and 90% but preferably between 30% and 70% higher than the flux per unit width at the centre of the strip.

For a strip between 150 and 250 mm wide, the peak value of the flux per unit length might be 30 to 50% higher than the value at the centre of the strip. Typically the peak value is made about 30% higher than the central value of the flux for narrow strip say between 150 and 250 mm wide but is made higher for wider strip and would typically reach a peak value of 70% above the central value for strip greater then 400 mm wide.

The peak value is preferably reached at a point about 45-50 mm inwardly from the edge of the strip as required by the pole pitch of the inductor; the distance inwardly may be less for narrower strip than for wider strip. The rate of increase of flux as one moves from the edge inwardly in this marginal region of the strip is conveniently substantially uniform.

It is preferred that the peak value of the flux per unit width should be maintained substantially uniformly across a part of the width of the strip for a distance of 20 to 60 mm. Typically the peak flux per unit width would be over a region having a width of 20 mm for a strip of the order of 150 to 250 mm wide, this peak flux region being made wider up to say 60 mm for wide strip, that is to say strip greater than 400 mm wide. The decrease in flux per unit width from the peak down to the central value may be at a substantially uniform rate and may typically extend over a width of between 20 and 30 mm.

According to another aspect of the invention, an induction heater for heating elongate strip material of a predetermined width comprises one or more pole pieces or pole assemblies adapted to extend across the width of the strip and arranged to give a flux per unit width at the margins of the strip within plus or minus 20% of the flux per unit width at the centre of the strip.

The invention furthermore includes within its scope an induction heater for heating elongate strip material of a width of 150 mm or more comprising one or more pole pieces or pole assemblies adapted to extend across the width of the workpiece, the workpiece being moved lengthwise adjacent the pole piece or pole pieces, the pole piece or pole pieces being contructed to give a flux distribution having peak values of flux per unit width in two regions inwardly located from the peripheral edges of the strip.

To achieve this required distribution with very little flux at the edges of the strip, the length of the pole pieces or pole assemblies (i.e. the dimensions across the width of the strip) may be less than the width of the strip.

As is well known, pole pieces for induction heaters are commonly formed of laminations and one convenient way of controlling the flux density is to make the laminations of different sizes so that the air gap through which the workpiece passes varies in length (along the flux path), the variation as described above being considered across the width of the strip. It is convenient in such an arrangement to have pole pieces above and below the workpiece, the pole pieces being appropriately profiled to give the required flux distribution. Thus for example to obtain the two peaks inwardly from each edge of the strip, it is required to have two regions of short air gap. This may be achieved by shaping the pole pieces so that one extends close to the workpiece in the appropriate region near one edge of the workpiece and the other extends close to the workpiece in the appropriate region adjacent the other edge of the workpiece.

Another way of achieving the required flux distribution is by fixing shaped ferromagnetic appendages onto a substantially level pole surface. For this purpose, it may be convenient to have a dovetail slot in a substantially flat surface of a pole piece, the slot extending along the length of the pole piece, that is to say transversely of the workpiece, and to secure an appendage of suitable ferromagnetic material which may be shaped as required by providing a dovetail on the appendage securable in the slot. The thickness of the appendage, that is to say the distance above the surface of the pole piece, and its width, that is to say its dimension in the direction of movement of the workpiece, may both be controlled to give the required flux density. Such an appendage may be made of laminated metal or of a powdered core or ferrite material with or without an iron wire matrix.

Another way of achieving the required flux distribution is by securing the laminations of the pole piece together with spacer material, the spacers being formed of different thickness or of different material in accordance with the required flux density distribution. The spacer material may be electrically conducting. The laminations may be of a suitable magnetic material for example steel or sintered magnetic powdered blocks; in the case of sintered powdered blocks, the dimensions of these may be chosen to control the flux distribution.

Yet another way of controlling the flux density across the width of the strip is by having pole pieces with a uniform air gap but with the dimensions varying across the width of the pole piece, i.e. in the lengthwise direction of the workpiece. In such an arrangement, the pole pieces would be wider where the greater flux per unit width is required. Such pole pieces may be formed of laminations or of machined pre-sintered magnetic powder blocks. In this arrangement, further control of the shape of the transverse flux density profile can be obtained by adjusting the relative position of upper and lower pole pieces above and below the workpiece in the direction of movement of the workpiece.

Yet another way of controlling the flux density profile is to provide bridging pieces between adjacent mangetic pole pieces such bridging pieces being located in an appropriate position or positions along the length of the pole pieces, that is to say across the width of the workpiece, to provide alternative flux paths thereby controlling local flux density through the workpiece. These bridging pieces may be made movable and may be magnetically excited if so desired by providing each with a coil or coils connected to an energising source.

Yet another way of controlling the flux density across the width of the workpiece is to provide additional current loops linking only part of the lengths of the pole pieces or pole assemblies.

For any given current and iron configuration of the inductor system, the flux distribution may also depend on the frequency of the supply and thus further control over the flux distribution may be obtained in some cases by adjusting the supply frequency.

When heating workpieces of magnetic materials, the thermal profile will depend on the intensity of the heating and hence control of the profile can be obtained by control of the intensity of the heating. In such an arrangement, the required amount of heating can be achieved by utilising an induction heating furnace of sufficient length of give the necessary heating even when the intensity of heating is at the minimum value.

BRIEF DESCRIPTION OF THE DRAWINGS

FIG. 3 is a graphical diagram illustrating flux distribution per unit width utilised in heating the strip;

FIGS. 7 and 8 are respectively a perspective view and a part plan view of part of a pole piece;

FIG. 14 is a diagram explaining a modification of the construction of FIG. 13; and FIG. 15 is a diagram illustrating another modification of the construction of FIG. 13.

DESCRIPTION OF PREFERRED EMBODIMENTS

Figure 1:
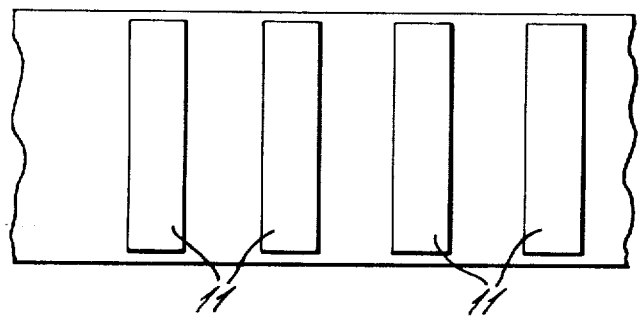
FIG. 1 is a diagrammatic plan view of an induction heater for heating strip material.
Figure 2:
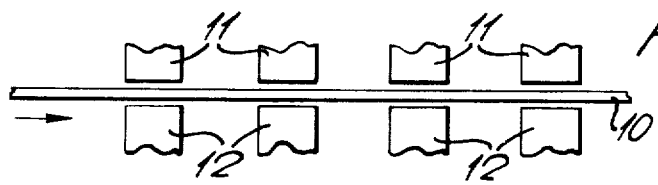
FIG. 2 is a diagrammatic side elevation of the induction heater of FIG. 1.

Referring to FIGS. 1 and 2, an alternating current induction heater for heating a workpiece 10 comprises essentially a series of magnetic poles extending across the width of the workpiece. Poles 11 are shown above the workpiece and poles 12 below the workpiece. These pole pieces, considered along the length of the workpiece, are usually of alternate polarity but not necessarily having the same flux. The pole pieces may be spaced regularly or irregularly. They may be energised from separate phases of a multi-phase, e.g. a three-phase, supply system. Some times the pole pieces are situated on one side only of the workpiece. In considering the heating effect, the important factor is the net flux density at the surface of the strip normal to the plane of that surface. The present invention is concerned here more particularly with the profile of the flux density measured in a direction across the width of the strip.

FIG. 3 shows diagrammatically the flux density profile across the width of the strip. In this diagram the uniform flux density (shown at 15 in the diagram) in the centre part of the strip is taken as unity and the flux density towards the edges of the strip are shown as proportions of that central flux density. For wide strip, that is to say greater than 400 mm wide, the flux density in a region inwardly from the edge of the strip has a peak 70% greater than the central flux density, this peak flux density extending over the region (shown at 16) from 45 mm inwardly from the edge to 100 mm inwardly from the edge. Inwardly from the peak, the flux density decreases substantially uniformly at 17 to reach the central level at about 130 mm in from the edge. In the peripheral region, the flux density falls substantially uniformly (as shown at 18) from the peak value to a value, at the edge of the strip, which in this particular case is 20% of the central flux density.

The lower graph in the diagram illustrates a flux density distribution for a narrower strip of the order of 200 to 250 mm wide. Here the peak flux density at 19 is 30% greater than the central flux density and extends over a narrower width of about 20 mm. The peak flux density, in this particular embodiment, occurs 50 mm inwardly from the edge of the strip; in the marginal region of the strip, the flux density falls substantially uniformly to a value of −20% (that is reversed polarity) of the central flux density. More generally the flux at the margins of the strip has a value between +20% and −20% of the central flux density. The decrease in flux density from the peak to the central region occurs substantially uniformly over a distance of about 20 mm.

For a narrow strip, less than 150 mm wide, the two regions of peak flux per unit width coalesce. For such a strip, the flux distribution across the strip starts from a value at each edge which is plus or minus 20% of the central flux and rises substantially uniformly, with a slope as in the graphs of FIG. 3 to a peak value which may be at the centre of the strip or across a central region of the strip.

Figures 4, 5:
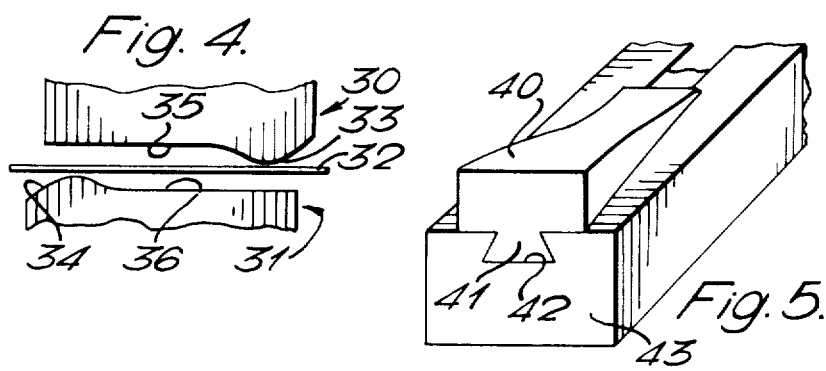
FIG. 4 is a diagrammatic view in elevation of one form of pole piece.
FIG. 5 is a diagrammatic perspective view of part of another form of pole piece.

FIG. 4 illustrates one form of pole construction for producing a flux distribution with two peaks as described above. In FIG. 4, the transverse profile of the pole pieces 30, 31 is shaped such that the length of the air gap through which the workpiece passes varies across the width of the workpiece which is shown at 32. It will be seen that there are peaks in the pole piece profiles at 33 and 34 corresponding to the required peaks in the flux density inwardly from the marginal edges of the strip. In the central regions of the pole pieces at 35 and 36, the pole pieces are uniformly spaced to give the uniform flux density.

FIG. 5 illustrates diagrammatically another way of achieving the shaping of the air gap. In FIG. 5, an appendage 40 of ferromagnetic material, e.g. laminated material or powdered core or ferrite material with or without an iron wire matrix, is formed with a dovetail 41 fitting in a co-operating dovetail-shaped slot 42 in a laminated transverse pole piece 43 which is of uniform dimensions across the width of the workpiece. Such an arrangement is particularly convenient where it is required to change the pole profile, e.g. for use with strips of different width; appropriate appendages may be fitted and fixed in position as required.

Figure 6:
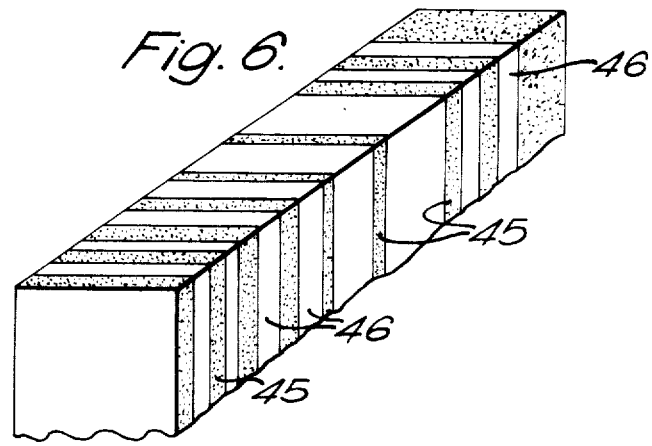
FIG. 6 is a diagrammatic perspective view illustrating yet another construction of pole piece.

FIG. 6 illustrates yet another construction of pole pieces in which laminated packs or sintered powdered block 45 are arranged with spacers 46 to form the pole structure. These spacers may have their width chosen to give the required variation in flux density. The different spacers may be made of materials with different permeabilities and may be electrically conductive.

Figure 9:
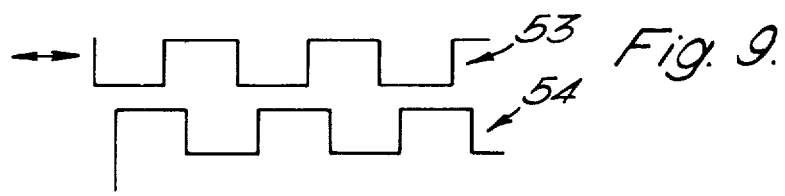
FIG. 9 is a diagram illustrating the positioning of upper and lower pole pieces of the kind shown in FIG. 7 and 8.

FIGS. 7 and 8 illustrate another construction in which pole pieces 50, 51, which are illustrated lying one on each side of the slot 52 to take conductors of a winding, have their width (that is to say their dimension in the length of movement of the workpiece and in the plane of the laminations) varying along the length of the pole piece, that is to say across the width of the workpiece. The wider portions of the pole pieces will give the required increase in flux per unit width (of the strip) inwardly from the marginal edges of the workpiece. If desired, as shown in FIG. 8, the pole pieces may be shaped to give a uniform slot width. These pole pieces may be formed of suitably shaped laminations or of a machined pre-sintered magnetic powder block. As shown in FIG. 9 by effecting relative transverse movement between top and bottom pole pieces 53, 54, when they are shaped in the manner shown in FIGS. 7 and 8, further control can be obtained of the flux density profile.

Figure 10:
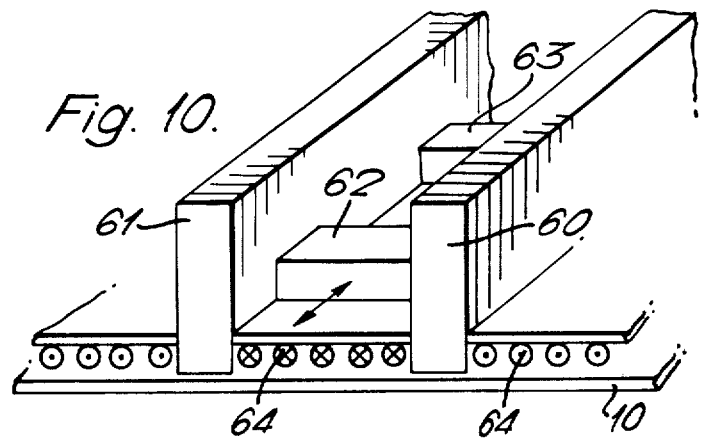
FIG. 10 is a perspective view of yet another construction of pole piece.

FIG. 10 illustrates yet another arrangement for controlling the flux density profile. In FIG. 10 two pole pieces 60, 61 are shown which are uniformly dimensioned across the width of the workpiece. Movable magnetic bridging elements 62, 63 are provided between the pole pieces to control the local flux density. The energising coils may be arranged as shown at 64. Additional energising coils may be provided around the movable magnetic bridges to give yet further control.

Figure 11:
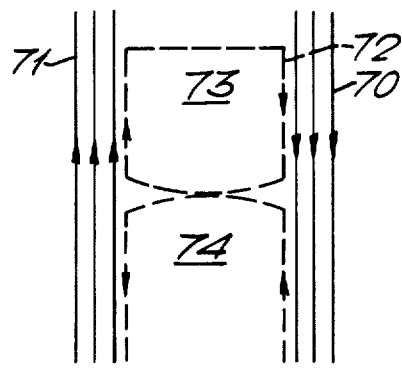
FIGS. 11 and 12 are two diagrams illustrating the positioning of auxiliary control windings controlling the flux density across a workpiece.

FIG. 11 illustrates diagrammatically control of the local flux density by arrangement of the electrical current loops. In FIG. 11, parts of the main current loops are shown at 70 and 71, the parts 70 and 71 lying at opposite sides of a pole piece. An auxiliary control winding 72, if arranged as shown, will cause the flux density to increase in the region indicated generally at 73 and to decrease in the region indicated at 74.

Figure 12:
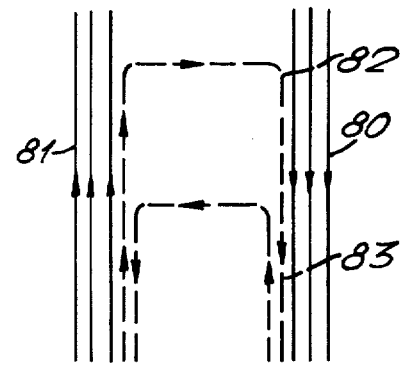

FIG. 12 illustrates another arrangement in which main current carrying conductors 80, 81 extend along slots between pole pieces. A auxiliary current conductor 82 provides increased flux density within the local loop formed by this current conductor and a further current conductor 83 provides a decrease flux density within the local loop formed by that conductor.

Figure 13:
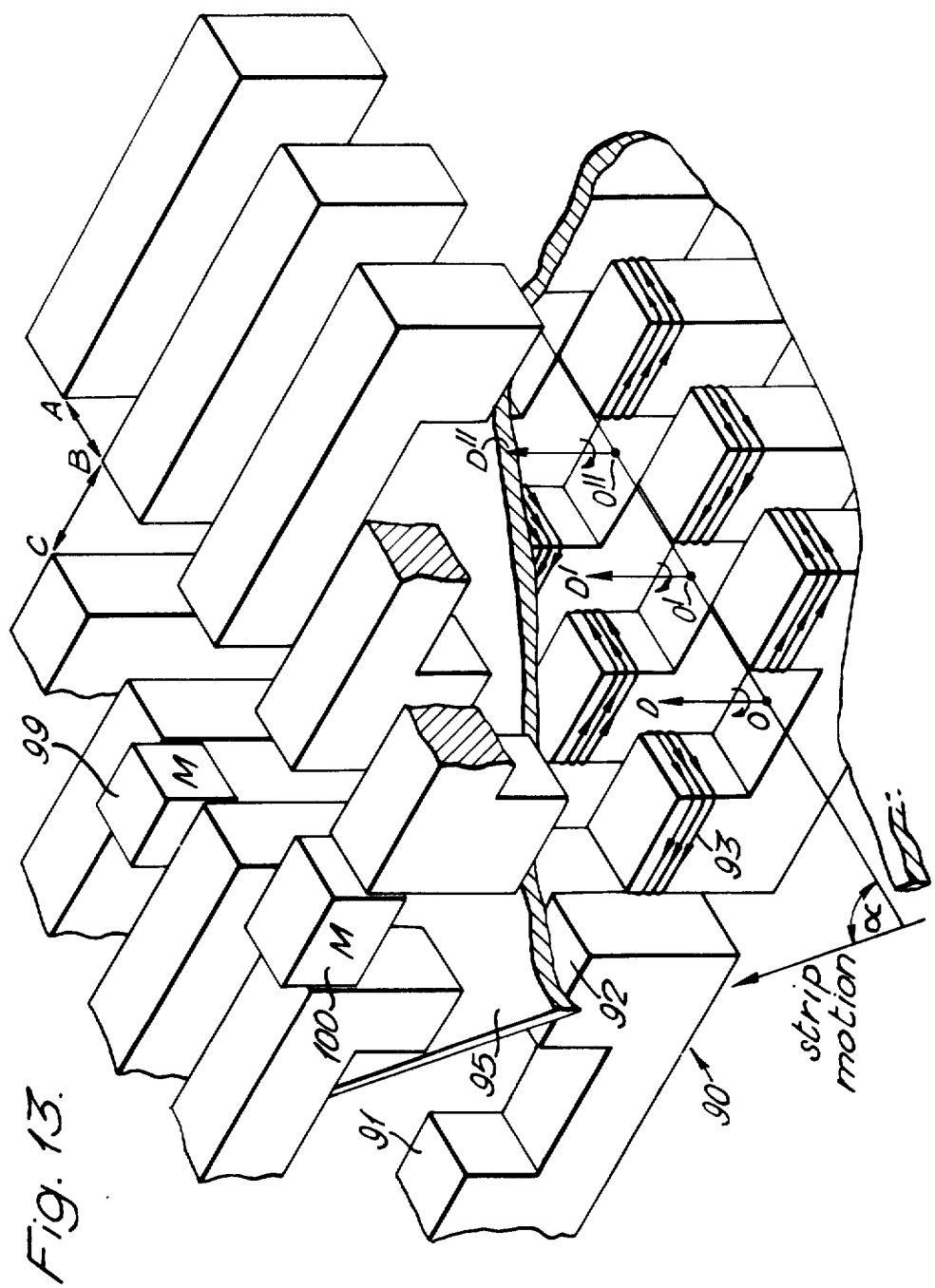
FIG. 13 is a perspective view of part of an induction heater illustrating yet another arrangement of pole piece.

FIG. 13 illustrates a modular construction particularly useful for transverse flux induction heaters which may be used for heating strips of a variety of different widths. This heater makes use of two pole modules, such as module 90 with poles 91, 92 and an energising winding 93. For clarity in the drawing, the energising winding has been shown only on three modules although each module is energised. Provision is made for separately controlling the excitation of each module or group of modules. The modules are arranged in sets extending across the width of the strip to be heated, as most clearly shown in FIG. 14. The modules in FIG. 14 in each set are parallel and side by side. The sets may extend at right angles to the length of a strip 95, as shown at 96 and 97 or may be arranged obliquely to the strip length, as shown at 98.

Modules are provided both above and below the strip to be heated. Each pole module is formed of laminated silicon steel or sintered magnetic material. The spacing, e.g. the distance AB in FIG. 13, between adjacent modules and the excitation is chosen in accordance with the required flux distribution across the width of the strip.

For control purposes, some or all of the following parameters may be made adjustable:

a. The spacing AB between adjacent modules in a row;

b. The spacing BC between adjacent rows of modules;

c. The angle of inclination (α) of each row of modules to the direction of strip motion;

d. The angular setting of each module about an axis (e.g. OD or O'D' or O"D") through the centre of the module normal to the plane of the strip; and e. The angle setting of each module about an axis (O O' O") parallel to the strip.

Some further degree of control may also be obtained by adjusting the positions of adjacent modules in a set relative to a transverse axis, as shown for rows 101, 102 and 103 of module in FIG. 15 and by the insertion of ferromagnetic spacers, such as spacers 99 (FIG. 13) between modules in a set and spacers 100 between modules in adjacent sets.

Conveniently, but not necessarily, the modules are all excited from one phase of an alternating supply. It is possible however, by distributing the modules across the different phases of a three-phase supply, to obtain a near-balanced three-phase inductor and to minimise the force effects of travelling magnetic fields.

We claim:

1. An induction heater for heating elongate strip material of a predetermined width, which strip is moved lengthwise through the heater at a uniform speed, which heater comprises at least one pole assembly extending transversely across the width of the strip, said pole assembly comprising at least one ferromagnetic pole carrier having a slot extending across the width of the strip and a plurality of pole pieces mounted in said slot for adjustment across the width of the strip but supported by said pole carrier against movement normal to the strip, said pole pieces being shaped and positioned to give a flux per unit width which varies across the width of the strip.

2. An induction heater as claimed in claim 1 and for heating a strip of predetermined width when the pole pieces are shaped and positioned to give a flux per unit width at the margins of the strip within plus or minus 20% of the flux per unit width at the centre of the strip.

3. An induction heater as claimed in claim 1 and for heating elongate strip material of a width of at least 150 mm when said pole pieces are shaped and positioned to give a flux distribution having peak values of flux per unit width in two regions located inwardly from the peripheral edges of the strip.

4. An induction heater as claimed in claim 1 wherein said pole pieces have a length measured in the direction across the width of the strip which is less than the width of the strip.

5. An induction heater as claimed in claim 1 and having pole pieces formed of laminations wherein, to control the flux density, the laminations in each pole piece comprise laminations of different sizes so that, across the width of the strip, the air gap through which the workpiece passes varies in length along the flux path.

6. An induction heater as claimed in claim 1 and having pole pieces above and below the workpiece, wherein the pole pieces are profiled to give a flux distribution with two peaks inwardly from each edge of the strip, the pole pieces above the workpiece extending close to the workpiece in a region near one edge of the workpiece and the pole pieces below the workpiece extending close to the workpiece in a region adjacent the other edge of the workpiece.

7. An induction heater as claimed in claim 1 and having shaped ferromagnetic appendages fixed onto substantially level pole surfaces.

8. An induction heater as claimed in claim 7 and having a dovetail slot in a substantially flat surface of a pole piece, the slot extending along the length of the pole piece, transversely of the length of the workpiece, appendages of ferromagnetic material being secured on the pole pieces by devetails on the appendages securable in the slots.

9. An induction heater as claimed in claim 1 wherein the pole pieces have a uniform air gap but have the dimensions varying across the width of the pole piece, i.e. in the lengthwise direction of the workpiece.

10. An induction heater as claimed in claim 9 and having upper and lower pole pieces above and below the workpiece adjustable in relative position in the direction of movement of the workpiece.

11. An induction heater as claimed in claim 1 and having auxilliary current loops linking only part of the lengths of the pole pieces or pole assemblies.

* * * * *